United States Patent
Lam et al.

(10) Patent No.: US 11,894,028 B2
(45) Date of Patent: *Feb. 6, 2024

(54) MAGNETIC RECORDING HEAD WITH TRAILING SHIELD HAVING MULTIPLE THROAT-HEIGHTS

(71) Applicant: Western Digital Technologies, Inc., San Jose, CA (US)

(72) Inventors: Quan-Chiu Harry Lam, San Jose, CA (US); Mark H. Burkhardt, San Jose, CA (US); El-Amine Salhi, Fremont, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/082,730

(22) Filed: Dec. 16, 2022

(65) Prior Publication Data

US 2023/0118634 A1    Apr. 20, 2023

Related U.S. Application Data

(62) Division of application No. 17/324,679, filed on May 19, 2021, now Pat. No. 11,657,837.

(51) Int. Cl.
*G11B 5/31* (2006.01)
*G11B 5/11* (2006.01)
*G11B 5/127* (2006.01)

(52) U.S. Cl.
CPC .............. *G11B 5/3116* (2013.01); *G11B 5/11* (2013.01); *G11B 5/1278* (2013.01); *G11B 5/315* (2013.01); *G11B 5/3146* (2013.01)

(58) Field of Classification Search
CPC ....... G11B 5/3116; G11B 5/11; G11B 5/1278; G11B 5/3146; G11B 5/315
See application file for complete search history.

(56) References Cited

U.S. PATENT DOCUMENTS

| | | |
|---|---|---|
| 7,835,111 B2 | 11/2010 | Flint et al. |
| 7,894,159 B2 | 2/2011 | Lengsfield et al. |
| 8,018,676 B2 | 9/2011 | Guan |

(Continued)

OTHER PUBLICATIONS

Van der Heijden, P. et al., "The effect of a trailing shield for perpendicular write heads", American Institute of Physics, 2006, https://aip.scitation.org/doi/10.1063/1.2158390, Last accessed Apr. 28, 2021.

(Continued)

*Primary Examiner* — Brian E Miller
(74) *Attorney, Agent, or Firm* — PATTERSON + SHERIDAN, LLP; Steven H. VerSteeg

(57) ABSTRACT

The present disclosure generally relates to data storage devices, and more specifically, to a magnetic media drive employing a magnetic recording head. The magnetic recording head comprises a main pole and a trailing shield disposed adjacent to the main pole. A recessed edge of the trailing shield has throat heights varying in the cross-track direction. In one embodiment, the central portion of the trailing shield has a first throat height greater than a second throat height of outer portions of the trailing shield. The trailing shield having varying throat heights in the cross-track direction strengthens the writing capability or improves the XTI of the magnetic recording head.

20 Claims, 9 Drawing Sheets

(56) References Cited

U.S. PATENT DOCUMENTS

| | | | |
|---|---|---|---|
| 8,238,056 B2 | 8/2012 | Guan et al. | |
| 8,861,316 B2 | 10/2014 | Yin et al. | |
| 9,082,423 B1* | 7/2015 | Liu | G11B 5/112 |
| 9,502,053 B1 | 11/2016 | Sasaki et al. | |
| 9,697,855 B1 | 7/2017 | Liu et al. | |
| 10,339,964 B1* | 7/2019 | Liu | G11B 5/11 |
| 11,087,783 B1* | 8/2021 | Song | G11B 5/3116 |
| 11,289,117 B1 | 3/2022 | Sasaki et al. | |
| 2007/0236831 A1* | 10/2007 | Che | G11B 5/1278 |
| 2007/0247751 A1 | 10/2007 | Hsiao et al. | |
| 2008/0232001 A1 | 9/2008 | Bonhote et al. | |
| 2008/0259498 A1* | 10/2008 | Lengsfield | G11B 5/3116 |
| 2008/0278861 A1 | 11/2008 | Jiang et al. | |
| 2021/0074318 A1 | 3/2021 | Wu | |
| 2022/0375495 A1* | 11/2022 | Lam | G11B 5/3146 |
| 2023/0118634 A1* | 4/2023 | Lam | G11B 5/1278 |

OTHER PUBLICATIONS

Morinaga, Akira et al., "Adjacent track interference analysis of shielded perpendicular writers", Journal of Megnetism and Magnetic Materials, vol. 320, Issue 22, Nov. 2008, pp. 2955-2958, https://www.sciencedirect.com/science/article/abs/pii/S0304885308008378?via%3Dihub, Last accessed Apr. 28, 2021.

* cited by examiner

MAGNETIC RECORDING HEAD WITH TRAILING SHIELD HAVING MULTIPLE THROAT-HEIGHTS

CROSS-REFERENCE TO RELATED APPLICATIONS

This application is a divisional of co-pending U.S. patent application Ser. No. 17/324,679, filed May 19, 2021. The aforementioned related patent applications is herein incorporated by reference.

BACKGROUND OF THE DISCLOSURE

Field of the Disclosure

Embodiments of the present disclosure generally relate to data storage devices, and more specifically, to a magnetic media drive employing a magnetic recording head.

Description of the Related Art

Over the past few years, various magnetic recording methods have been studied to improve the areal density of a magnetic media device, such as a hard disk drive (HDD). Magnetic recording heads, or write heads, in HDDs can have a significant effect on the overall performance and reliability of the recording device. Magnetic recording heads may be designed to achieve specific advantages, such as improved performance, but may consequently have a negative impact on other characteristics, such as decreased reliability.

For example, some magnetic recording head designs use various shields around a main pole, such as side shields, leading shields, and trailing shields, to make the magnetic recording head sufficiently strong to write data to magnetic media. However, in such designs, making the writing strength too strong causes spill-over of magnetic fields, resulting in erasures of data. The spill-over of magnetic fields may result in adjacent-track-interference (ATI), wrong-track-interference (WTI), near-track-interference (NTI), and/or far-track-interference (FTI), depending on where the erasure occurs. ATI, WTI, NTI, and FTI are collectively referred to as XTI herein. As a result, the areal density recording of the magnetic recording head suffers, and the overall reliability of the magnetic recording head decreases.

Therefore, there is a need in the art for a magnetic recording head having improved shields.

SUMMARY OF THE DISCLOSURE

The present disclosure generally relates to data storage devices, and more specifically, to a magnetic media drive employing a magnetic recording head. The magnetic recording head comprises a main pole and a trailing shield disposed adjacent to the main pole. A recessed edge of the trailing shield has throat heights varying in the cross-track direction. In one embodiment, a central portion of the trailing shield disposed adjacent or closest to the main pole has a first throat height less than a second throat height of outer portions of the trailing shield further from the main pole. In another embodiment, the central portion of the trailing shield has a first throat height greater than a second throat height of outer portions of the trailing shield. The trailing shield having varying throat heights in the cross-track direction strengthens the writing capability or improves the XTI of the magnetic recording head.

In one embodiment, a magnetic recording head comprises a main pole and a trailing shield disposed adjacent to the main pole. The trailing shield comprises a recessed edge adjacent to the main pole, a media facing surface disposed opposite the recessed edge, the media facing surface being substantially planar, a central portion disposed adjacent to the main pole having a first throat height defined between the recessed edge and the media facing surface, and at least one outer portion disposed adjacent to the central portion, the at least one outer portion having a second throat height defined between the recessed edge and the media facing surface. The second throat height is greater than the first throat height such that the trailing shield is tapered along the recessed edge in a cross-track direction from the at least one outer portion towards the central portion.

In another embodiment, a magnetic recording head comprises a main pole and a trailing shield disposed adjacent to the main pole. The trailing shield comprises a recessed edge disposed adjacent to the main pole, a media facing surface disposed opposite the recessed edge, the media facing surface being substantially planar, a central portion disposed adjacent to the main pole having a first throat height defined between a first surface of the recessed edge and the media facing surface, and at least one outer portion disposed adjacent to the central portion, the at least one outer portion having a second throat height defined between a second surface of the recessed edge and the media facing surface. The second throat height is less than the first throat height such that the trailing shield is tapered along the recessed edge in a cross-track direction from the central portion towards the at least one outer portion.

In another embodiment, a magnetic recording head comprises a main pole and a trailing shield disposed adjacent to the main pole. The trailing shield comprises a recessed edge disposed adjacent to the main pole, the recessed edge comprising one or more steps, wherein each of the one or more steps comprises a first surface and a second surface, a media facing surface disposed opposite the recessed edge, the media facing surface being substantially planar, a central portion disposed adjacent to the main pole having a first throat defined between a third surface of the recessed edge and the media facing surface, the third surface being disposed parallel to the media facing surface, and at least one outer portion disposed adjacent to the central portion, the at least one outer portion having a second throat height defined between the second surface of a first step of the one or more steps of the recessed edge and the media facing surface. The first throat height is different than the second throat height such that the trailing shield is tapered along the recessed edge in a cross-track direction.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
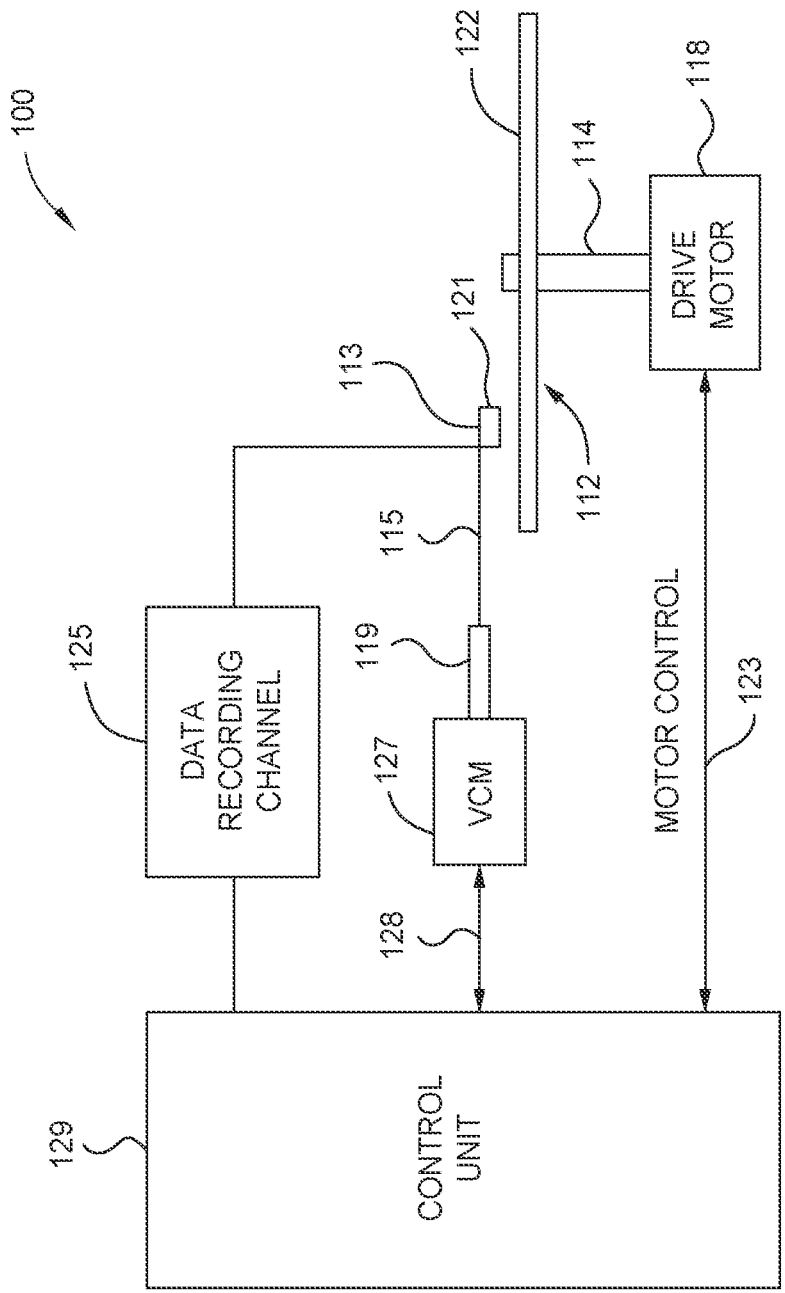
FIG. 1 illustrates a magnetic recording device embodying this disclosure.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, and more specifically, to a magnetic media drive employing a magnetic recording head. The magnetic recording head comprises a main pole and a trailing shield disposed adjacent to the main pole. A recessed edge of the trailing shield has varying throat heights in the cross-track direction. In one embodiment, a central portion of the trailing shield disposed adjacent or closest to the main pole has a first throat height less than a second throat height of outer portions of the trailing shield further from the main pole. In another embodiment, the central portion of the trailing shield has a first throat height greater than a second throat height of outer portions of the trailing shield. The trailing shield having varying throat heights in the cross-track direction strengthens the writing capability or improves the XTI of the magnetic recording head.

It is to be understood that the embodiments discussed herein are applicable to a data storage device such as a hard disk drive (HDD) as well as a tape drive such as a tape embedded drive (TED) or an insertable tape media drive such as those made according to Linear Tape Open (LTO) standards. An example TED is described in co-pending patent application titled "Tape Embedded Drive," United States Publication. No. 2020/0258544, filed Mar. 26, 2019, assigned to the same assignee of this application, which is herein incorporated by reference. As such, any reference in the detailed description to an HDD or tape drive is merely for exemplification purposes and is not intended to limit the disclosure unless explicitly claimed. For example, references to disk media in an HDD embodiment are provided as examples only, and can be substituted with tape media in a tape drive embodiment. Furthermore, reference to or claims directed to magnetic recording devices or data storage devices are intended to include at least both HDD and tape drive unless HDD or tape drive devices are explicitly claimed.

It is also to be understood that aspects disclosed herein, such as the magnetoresistive devices, may be used in magnetic sensor applications outside of HDD's and tape media drives such as TED's, such as spintronic devices other than HDD's and tape media drives. As an example, aspects disclosed herein may be used in magnetic elements in magnetoresistive random-access memory (MRAM) devices (e.g., magnetic tunnel junctions as part of memory elements), magnetic sensors or other spintronic devices.

FIG. 1 illustrates a magnetic recording device 100 embodying this disclosure. As shown, at least one rotatable magnetic media 112 is supported on a spindle 114 and rotated by a disk drive motor 118. The magnetic recording on each disk is in the form of any suitable pattern of data tracks, such as annular patterns of concentric data tracks (not shown) on the magnetic media 112.

At least one slider 113 is positioned near the magnetic media 112, each slider 113 supporting one or more magnetic head assemblies 121. As the magnetic media rotates, the slider 113 moves radially in and out over the media surface 122 so that the magnetic head assembly 121 may access different tracks of the magnetic media 112 where desired data are written. Each slider 113 is attached to an actuator arm 119 by way of a suspension 115. The suspension 115 provides a slight spring force that biases the slider 113 toward the media surface 122. Each actuator arm 119 is attached to an actuator means 127. The actuator means 127 as shown in FIG. 1 may be a voice coil motor (VCM). The VCM includes a coil movable within a fixed magnetic field, the direction and speed of the coil movements being controlled by the motor current signals supplied by control unit 129.

During operation of the magnetic recording device 100, the rotation of the magnetic media 112 generates an air bearing between the slider 113 and the media surface 122, which exerts an upward force or lift on the slider 113. The air bearing thus counter-balances the slight spring force of suspension 115 and supports slider 113 off and slightly above the media 112 surface by a small, substantially constant spacing during normal operation. In the case of EAMR, a DC magnetic field generated from an assist element of the magnetic head assembly 121 enhances the write-ability so that the write element of the magnetic head assembly 121 may efficiently magnetize the data bits in the media 112.

The various components of the magnetic recording device 100 are controlled in operation by control signals generated by control unit 129, such as access control signals and internal clock signals. Typically, the control unit 129 comprises logic control circuits, storage means, and a microprocessor. The control unit 129 generates control signals to control various system operations, such as drive motor control signals on line 123 and head position and seek control signals on line 128. The control signals on line 128 provide the desired current profiles to optimally move and position slider 113 to the desired data track on media 112. Write and read signals are communicated to and from write and read heads on the assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

Figure 2:
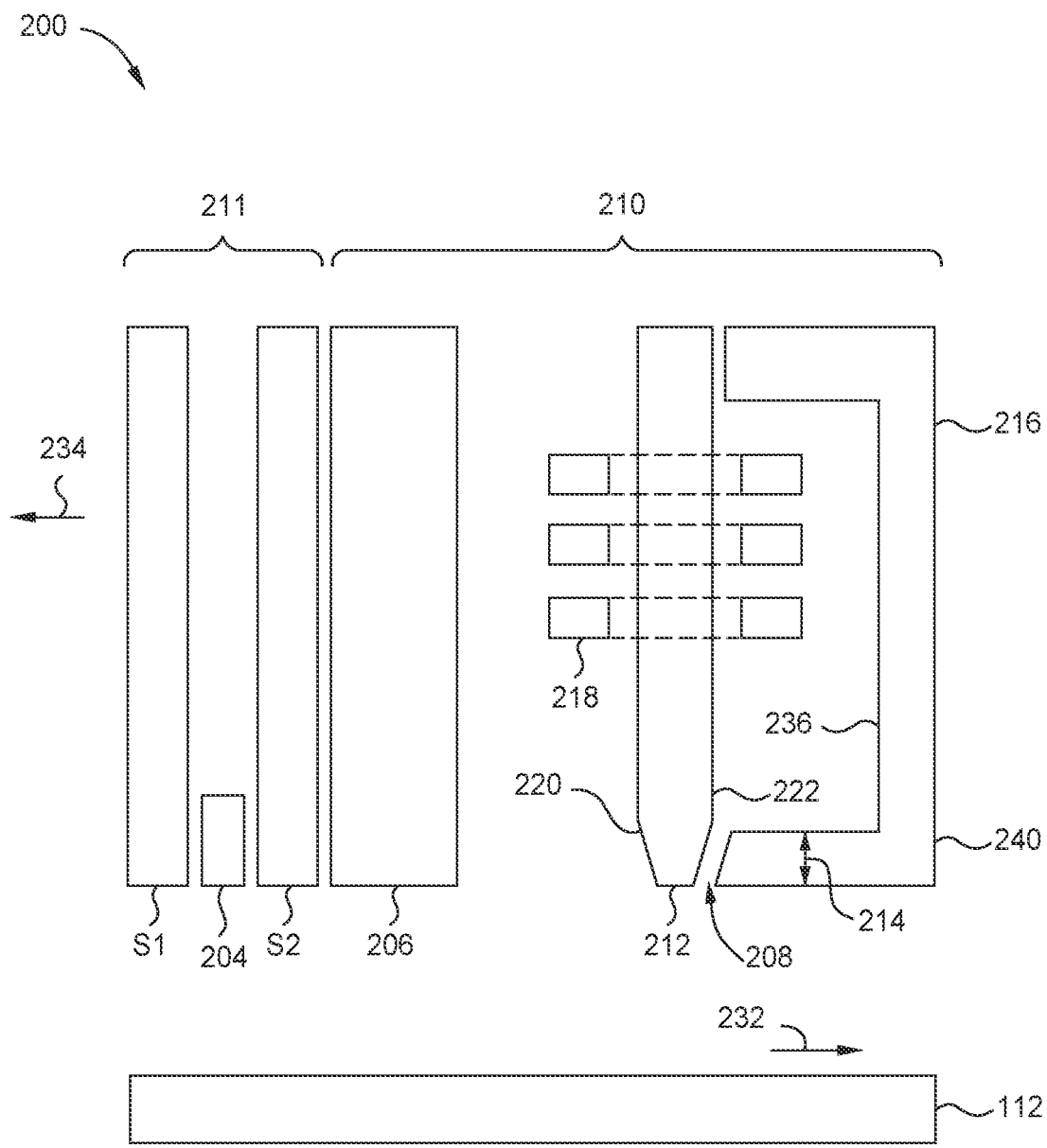
FIG. 2 is a fragmented, cross sectional side view through the center of a read/write head facing the magnetic media, according to one embodiment.

FIG. 2 is a fragmented, cross sectional side view through the center of a read/write head 200 facing the magnetic media 112, according to one embodiment. The read/write head 200 may correspond to the magnetic head assembly 121 described in FIG. 1. The read/write head 200 includes a media facing surface (MFS) 212, such as an air bearing surface (ABS), a magnetic write head 210, and a magnetic read head 211, and is mounted such that the MFS 212 is facing the magnetic media 112. The read/write head 200 may be an energy-assisted magnetic recording (EAMR) head. In FIG. 2, the magnetic media 112 moves past the write head 210 in the direction indicated by the arrow 232 and the read/write head 200 moves in the direction indicated by the arrow 234.

In some embodiments, the magnetic read head 211 is a magnetoresistive (MR) read head that includes an MR sensing element 204 located between MR shields S1 and S2. In other embodiments, the magnetic read head 211 is a magnetic tunnel junction (MTJ) read head that includes a MTJ sensing element 204 located between MR shields S1 and S2. The magnetic fields of the adjacent magnetized regions in the magnetic media 112 are detectable by the MR (or MTJ) sensing element 204 as the recorded bits.

The write head 210 includes a main pole 220, an upper-return pole 216 coupled to a trailing shield 240, and a coil 218 that excites the main pole 220. The write head 210 optionally comprises an additional return pole 206. The coil 218 may have a "pancake" structure which winds around a back-contact between the main pole 220 and the return pole 216, instead of a "helical" structure shown in FIG. 2. A trailing gap 208 located between the trailing shield 240 and the main pole 220, and a leading gap (not shown), may be in contact with the main pole 220 and a leading shield (not shown) may be in contact with the leading gap. A recording magnetic field is generated from the main pole 220 and the trailing shield 240 helps making the magnetic field gradient of the main pole 220 steep. Extending from the MFS into the read/write head 200, the portion of the trailing shield 240 disposed adjacent to the main pole 220 has a throat height 214, as discussed further below in FIGS. 4A-5C. The main pole 220 may be a magnetic material such as an FeCo alloy. The main pole 220 may include a trailing surface 222, which may be parallel to a leading surface 236 of the trailing shield 240. The main pole 220 may be a tapered write pole (TWP) with a trailing edge taper (TET) configuration. The main pole 220 may comprise ferromagnetic materials, typically alloys of one or more of Co, Fe, and Ni.

Figure 3:
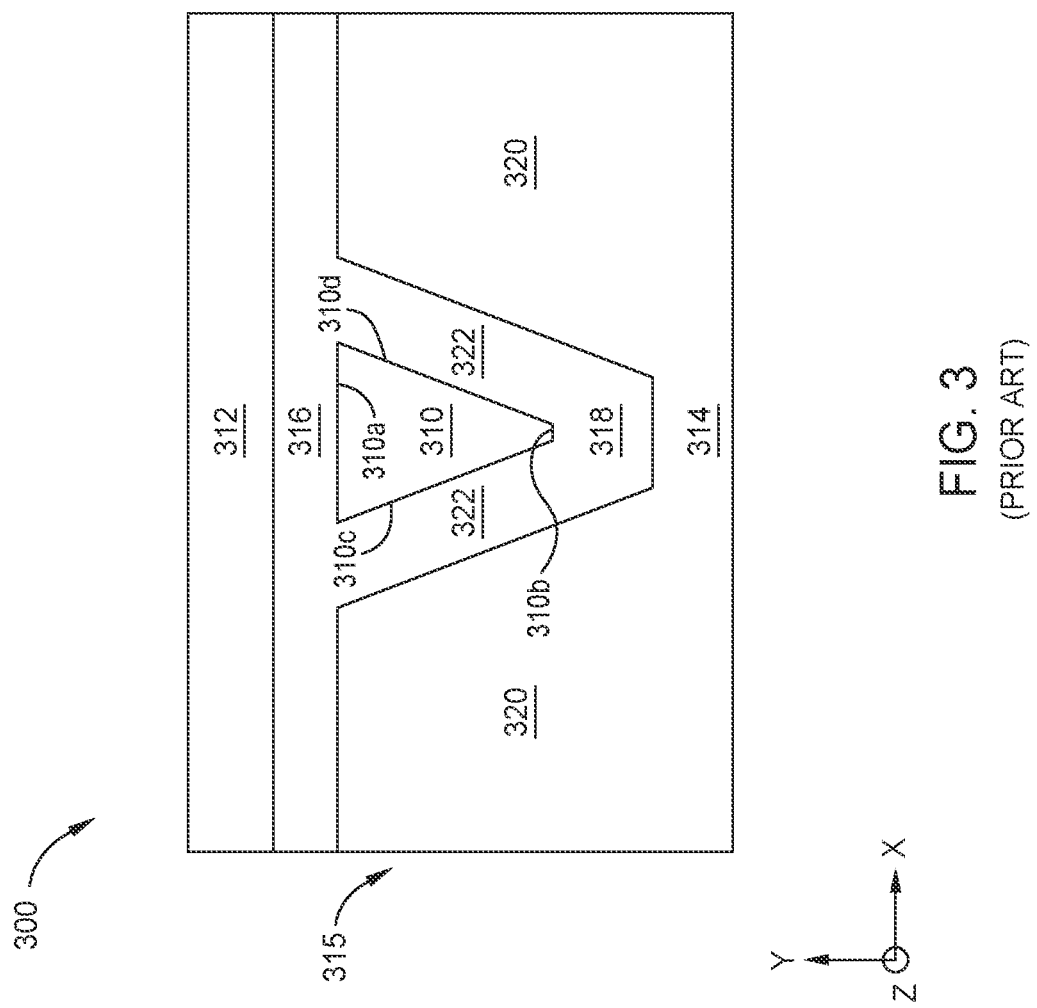
FIG. 3 illustrates a media facing surface (MFS) view of a magnetic recording head, according to one embodiment.

FIG. 3 illustrates a media facing surface (MFS) view of a magnetic recording head 300, according to one embodiment. The magnetic recording head 300 may be the write head 210 of FIG. 2. The magnetic recording head 300 is within a magnetic recording device, such as the magnetic recording device 100 of FIG. 1.

The magnetic recording head 300 comprises a main pole 310 disposed between a trailing shield 312 and a leading shield 314 in the y-direction. The trailing shield 312 is disposed adjacent to a first surface 310a of the main pole 310, and the leading shield is disposed adjacent to a second surface 310b of the main pole 310. The first surface 310a is opposite the second surface 310b. The main pole 310 is further disposed between side shields 320 in the x-direction. The side shields 320 are disposed adjacent to a third surface 310c and a fourth surface 310d of the main pole 310, where the third surface 310c is opposite the fourth surface 310d. A trailing gap 316 is disposed between the first surface 310a of the main pole 310 and the trailing shield 312, and a leading gap 318 is disposed between the second surface 310b of the main pole 310 and the leading shield 314. Side gaps 322 are disposed between the third and fourth surfaces 310c, 310d of the main pole 310 and the side shields 320.

Figure 4A:
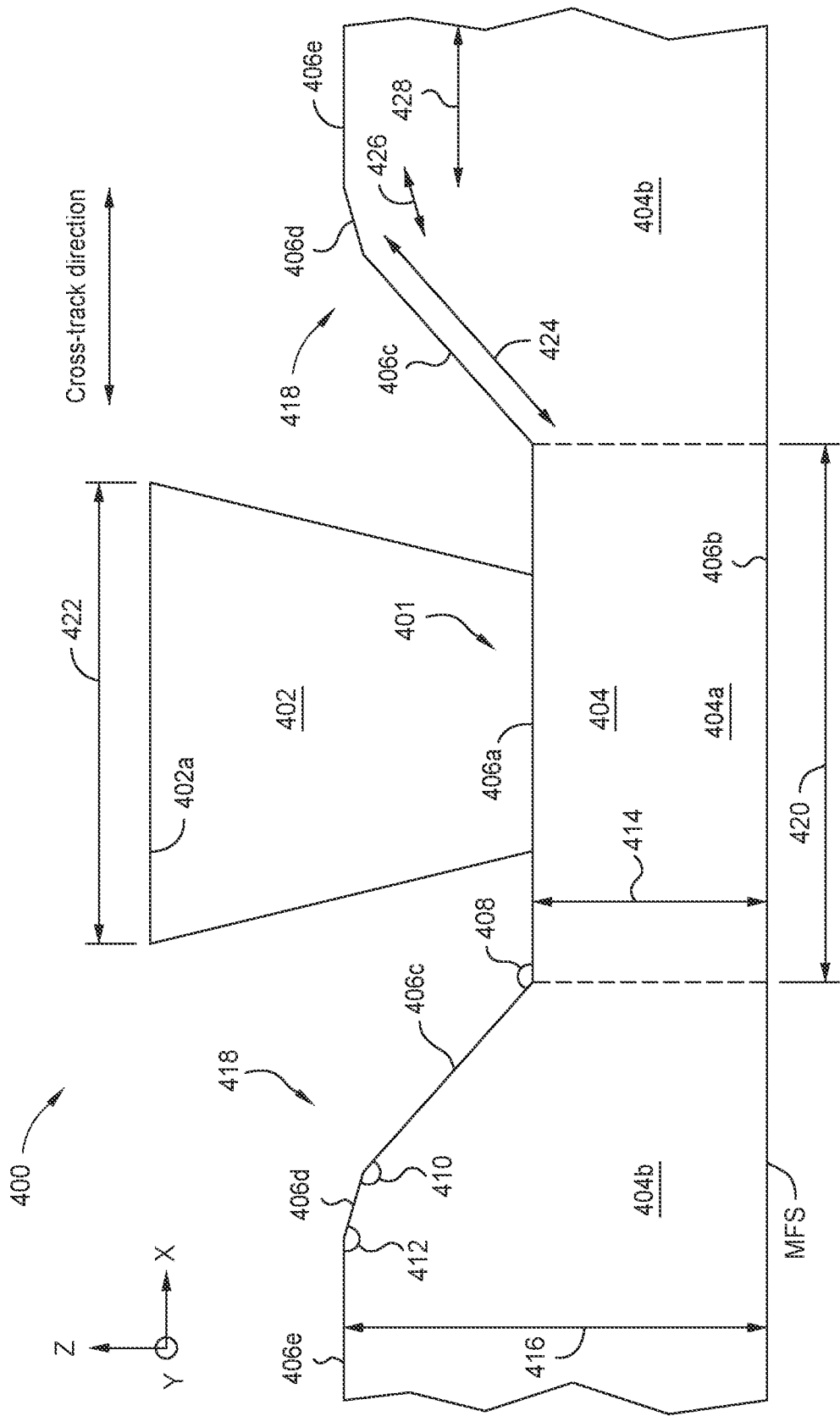
FIGS. 4A-5C illustrate cross-sectional views of magnetic recording heads comprising a trailing shield having varying throat heights, according to various embodiments.
Figure 4B:
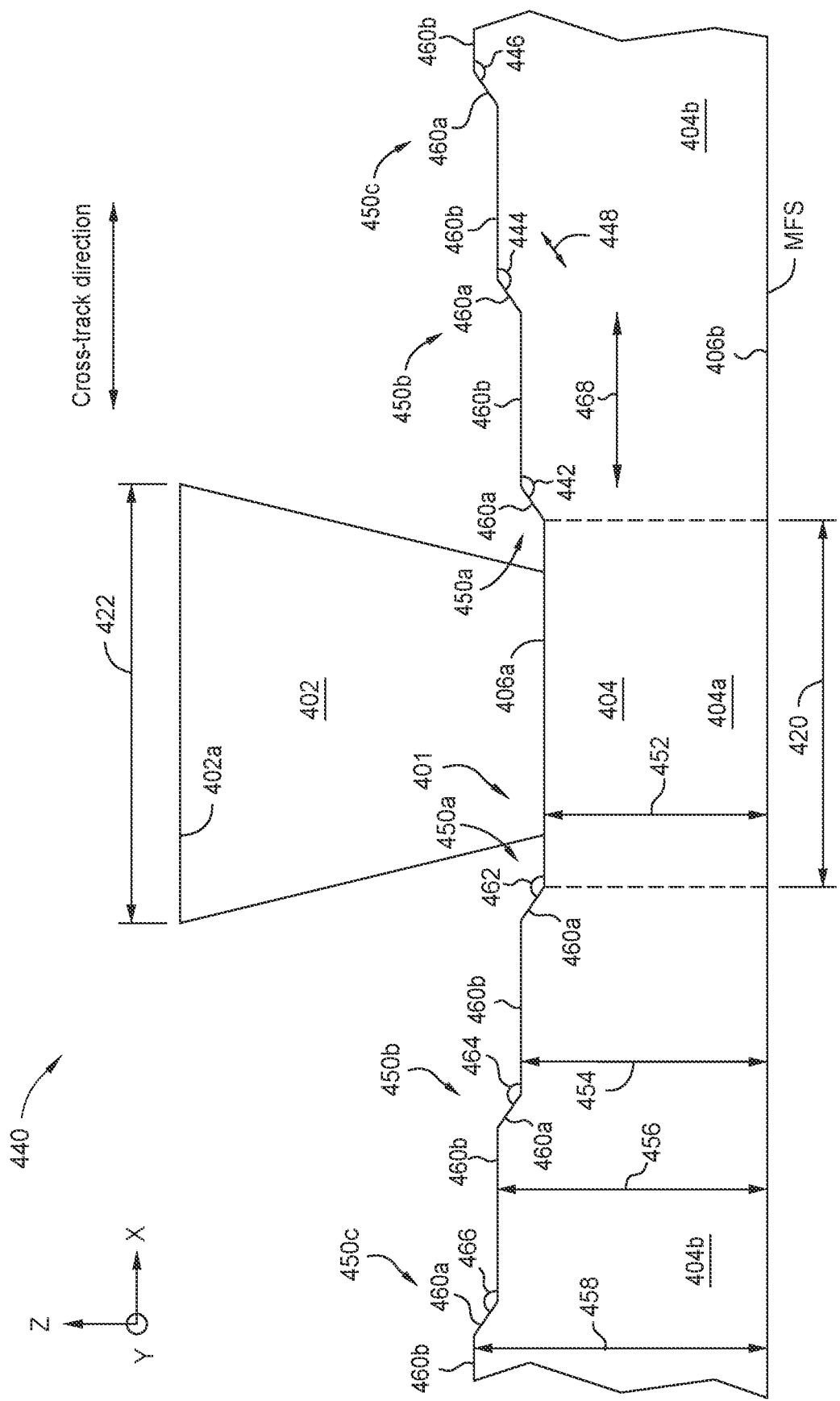
Figure 4C:
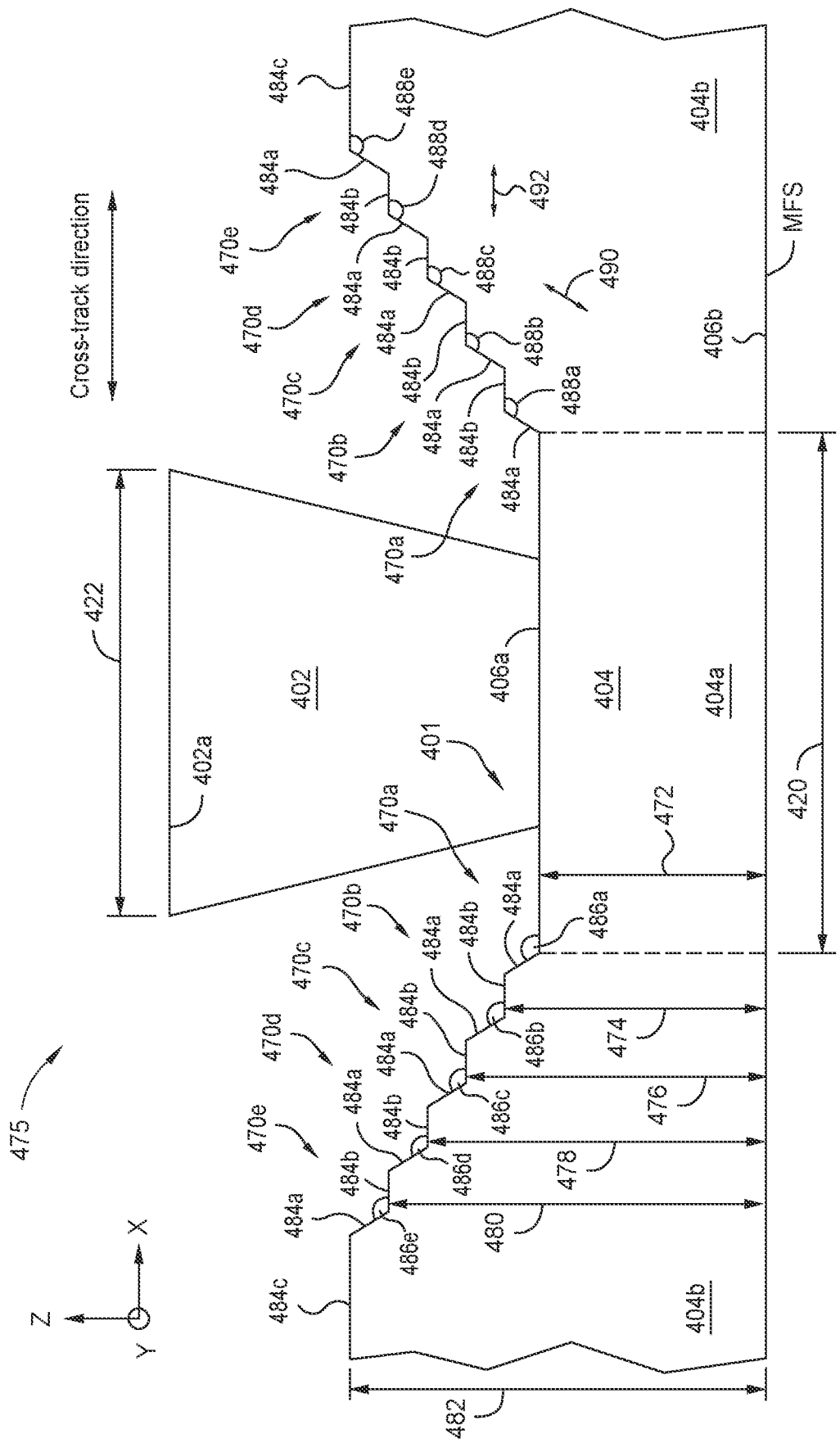

FIGS. 4A-4C illustrate cross-sectional views of magnetic recording heads 400, 440, 475, respectively, having varying throat heights in the cross-track direction, according to various embodiments. Each of the magnetic recording heads 400, 440, 475 may be the write head 210 of FIG. 2. Each of the magnetic recording heads 400, 440, 475 is within a magnetic recording device, such as the magnetic recording device 100 of FIG. 1. Each of the magnetic recording heads 400, 440, 475 may be the magnetic recording head 300 of FIG. 3, and various elements, such as the side shields, side gaps, and trailing gap, of the magnetic recording heads 400, 440, 475 of FIGS. 4A-4C are not shown for clarity. Moreover, it is noted that FIGS. 4A-4C are not drawn to scale, particularly in the x-direction and the z-direction, and are not intended to be limiting as such. For example, FIGS. 4A-4C focus primarily on a central portion of the trailing shield 404 without showing the outer ends extending away in the x-directions.

The magnetic recording heads 400, 440, 475 of FIGS. 4A-4C each comprise a main pole 402 and a trailing shield (TS) 404. The TS 404 comprises a central portion 404a and two outer portions 404b coupled to the central portion 404a. The outer portions 404b are mirror images of one another. The central portion 404a and the outer portions 404b are defined by the dashed lines. A first surface 406a of the central portion 404a of the TS 404 is disposed adjacent to the main pole 402. The first surface 406a may be substantially linear in the x-direction such that the first surface 406a of the TS 404 is parallel to the MFS 406b. A second surface 406b of the TS 404 is disposed opposite to the first surface 406a at the MFS. For perspective, it is noted that the y-direction is the along-the-track direction.

In each of the magnetic recording heads 400, 440, 475, the central portion 404a has a first throat height 414 less than a second throat height 416 of the outer portions 404b, as described further below. A recessed edge 401 of the TS 404 disposed opposite to the MFS 406b tapers in thickness in the cross-track direction towards the central portion 404a while the MFS 406b remains substantially planar or flat.

The TS 404 of the magnetic recording head 400 further comprises third surfaces 406c coupled to the first surface 406a. The third surfaces 406c are disposed at a first angle 408 in the xz-direction with respect to the first surface 406a. The first angle 408 is between about 100° to about 175°, such as about 140°. Fourth surfaces 406d of the TS 404 are coupled to the third surfaces 406c. The fourth surfaces 406d are disposed at a second angle 410 in the xz-direction with respect to the third surfaces 406c. The second angle 410 is between about 100° to about 175°, such as about 165°. Fifth surfaces 406e of the TS 404 are coupled to the fourth surfaces 406d. The fifth surfaces 406e are disposed at a third angle 412 in the xz-direction with respect to the fourth surfaces 406d. The third angle 412 is between about 100° to about 175°, such as about 155°. In one embodiment, the fifth surfaces 406e may be disposed substantially parallel to the first surface 406a. The third, fourth, and fifth surfaces 406c, 406d, 406e form a step 418 between the central portion 404a to the outer portions 404b. The step 418 extend in the xz-direction towards the first surface 402a of the main pole 402.

Each of the third surfaces 406c has a first length 424 between about 50 nm to about 800 nm, each of the fourth surfaces 406d have a second length 426 between about 50 nm to about 400 nm, and each of the fifth surfaces 406e have a third length 428 between about 500 nm to about 16 μm. In some embodiments, the third length 428 is about half the total width (not shown) of the TS 404, where the total width of the TS 404 is about 30 μm. While the first length 424 is shown to be the longest in FIG. 4A, the lengths 424, 426, 428 of each of the third, fourth, and fifth surfaces 406c, 406d, 406e may vary. For example, the first length 424 may be shorter than the second length 426, or the first, second, and third lengths 424, 426, 428 may be equal. As such, the lengths 424, 426, 428 of each of the third, fourth, and fifth surfaces 406c, 406d, 406e are not intended to be limiting.

The central portion 404a of the TS 404 between the first surface 406a and the MFS 406b has a first throat height 414 in the z-direction. The outer portions 404b of the TS 404 between the MFS 406b and the fifth surfaces 406e have a second throat height 416 in the z-direction. The second throat height 416 is greater than the first throat height 414. Thus, going from the central portion 404a towards the outer portions 404b, the throat height of the TS 404 increases. The first throat height 414 is between about 100 nm to about 600 nm, such as about 250 nm. The second throat height 416 is between about 400 nm to about 1000 nm, such as about 650 nm. As such, the TS 404 has varying throat heights 414, 416, wherein the first throat height 414 is shorter closer to the main pole 402, and the second throat height 416 is larger further away from the main pole 402 in the cross-track direction. In other words, the recessed edge 401 of the TS 404 tapers in thickness in the cross-track direction from the outer portions 404b towards the central portion 404a.

While the magnetic recording head 400 of FIG. 4A is shown having one step 418 between the central portion 404a and the outer portions 404b, the magnetic recording head 400 may comprise more than one step 418. The magnetic recording head 440 of FIG. 4B is similar to the magnetic recording head 400 of FIG. 4A; however, the TS 404 of magnetic recording head 440 varies in throat height in a more gradual manner such that the recessed edge 401 is zigzagged or jagged-like in appearance.

Furthermore, while the outer portions 404b of FIG. 4A are shown as being symmetrical, the outer portions 404b may be asymmetrical. For example, the outer portion 404b in the x-direction (i.e., the rightmost side) may have more or less steps 418 than the outer portion 404b in the −x-direction (i.e., the leftmost side), or the step(s) 418 of the outer portion 404b in the x-direction may be steeper than the step(s) 418 of the outer portion 404b in the −x-direction. In some embodiments, only one outer portion 404b may vary in throat height from the central portion 404a, or one outer portion 404b may have different throat heights or throat height variations than the other outer portion 404b. For example, the outer portion 404b in the x-direction (i.e., the rightmost side) may have the second throat height 416 while the outer portion 404b in the −x-direction (i.e., the leftmost side) may have the first throat height 414. Such asymmetry in the outer portions 404b may be beneficial in shingled-magnetic recording (SMR), where the XTI demands may vary from one side of the write head to the other.

In FIG. 4B, each outer portion 404b of the TS 404 comprises three steps 450a-450c (collectively referred to as steps 450). While three steps 450 are shown in FIG. 4B, the magnetic recording head 440 may comprise a fewer number or a greater number of steps 450, and the number of steps 450 is not intended to be limiting. Each step 450a-450c comprises a first surface 460a coupled to a second surface 460b, where the second surface 460b of the first step 450a is coupled to the first surface 460a of the second step 450b, and the second surface 460b of the second step 450b is coupled to the first surface 460a of the third step 450c. The first surface 460a of the first step 450a is coupled to the first surface 406a of the central portion 404a of the TS 404. The steps 450a-450c extend in the xz-direction towards the first surface 402a of the main pole 402.

The first surface 460a of the first step 450a is disposed at a first angle 462 in the xz-direction with respect to the first surface 406a of the central portion 404a. The first angle 462 is between about 100° to about 175°, such as about 140°. Similarly, the second surface 460b of the first step 450a is disposed at a second angle 464 in the xz-direction with respect to the first surface 460a of the second step 450b, and the second surface 460b of the second step 450b is disposed at a third angle 466 in the xz-direction with respect to the first surface 460a of the third step 450c. The second angle 464 and the third angle 466 are each individually between about 100° to about 175°, such as about 140°. In some embodiments, one or more of the first, second, and third angles 462, 464, 466 are the same.

Furthermore, the first surface 460a of the first step 450a is disposed at a fourth angle 442 in the xz-direction with respect to the second surface 460b of the first step 450a, where the fourth angle 442 is between about 100° to about 175°. The first surface 460a of the second step 450b is disposed at a fifth angle 444 in the xz-direction with respect to the second surface 460b of the second step 450b, where the fifth angle 444 is between about 100° to about 175°. The first surface 460a of the third step 450c is disposed at a sixth angle 446 in the xz-direction with respect to the second surface 460b of the third step 450c, where the sixth angle 446 is between about 100° to about 175°. In some embodiments, one or more of the fourth, fifth, and sixth angles 442, 444, 446 are the same.

The first surface 460a of each step 450a-450c has a first length 448 between about 50 nm to about 600 nm and the second surface 460b of each step 450a-450c has a second length 468 between about 100 nm to about 10 μm. The lengths 448, 468 may vary. For example, the first length 448 may be longer than the second length 468, or the first length 448 may be shorter than the second length 468, or the first and second lengths 448, 468 may be equal. As such, the lengths 448, 468 are not intended to be limiting and are merely examples. Furthermore, while the second surface 460b of each step 450a-450c is shown as being parallel to the MFS 406b, the second surface 460b of each step 450a-450c may be disposed at an angle to the MFS 406b.

The central portion 404a of the TS 404 between the first surface 406a and the MFS 406b has a first throat height 452 in the z-direction. The outer portions 404b of the TS 404 comprise three or more throat heights in the z-direction. As shown in FIG. 4B, a second throat height 454 is defined between the MFS 406b and the second surface 460b of the first step 450a, a third throat height 456 is defined between the MFS 406b and the second surface 460b of the second step 450b, and a fourth throat height 458 is defined between the MFS 406b and the second surface 460b of the third step 450c.

The second throat height 454 is greater than the first throat height 452, the third throat height 456 is greater than the second throat height 454, and the fourth throat height 458 is greater than the first, second, and third throat heights 452, 454, 456. Thus, going from the central portion 404a towards the outer portions 404b, the throat height of the TS 404 increases. The first throat height 452 is between about 100 nm to about 600 nm, such as about 250 nm. The fourth throat height 458 is between about 400 nm to about 1500 nm, such as about 800 nm. As such, the TS 404 has varying throat heights 452, 454, 456, 458, wherein the first throat height 452 is shorter closer to the main pole 402, and the fourth throat height 458 is larger further away from the main pole 402 in the cross-track direction. In other words, the recessed edge 401 of the TS 404 tapers in thickness in the cross-track direction from the outer portions 404b towards the central portion 404a.

While the outer portions 404b of FIG. 4B are shown as being symmetrical, the outer portions 404b may be asymmetrical. For example, the outer portion 404b in the x-direction (i.e., the rightmost side) may have more or less steps 450 than the outer portion 404b in the −x-direction (i.e., the leftmost side), or the step(s) 450 of the outer portion 404b in the x-direction may be steeper than the step(s) 450 of the outer portion 404b in the −x-direction. In some embodiments, only one outer portion 404b may vary in throat height from the central portion 404a, or one outer portion 404b may have different throat heights or throat height variations than the other outer portion 404b. For example, the outer portion 404b in the x-direction (i.e., the rightmost side) may have one or more of the second, third, and fourth throat heights 454, 456, 458 while the outer portion 404b in the −x-direction (i.e., the leftmost side) may have the first throat height 452, the second throat height 454, and/or the third throat height 456. Such asymmetry in the outer portions 404b may be beneficial in SMR, where the XTI demands may vary from one side of the write head to the other.

The magnetic recording head 475 of FIG. 4C is similar to the magnetic recording head 400 of FIG. 4A and the magnetic recording head 440 of FIG. 4B; however, the TS 404 of magnetic recording head 475 varies in throat height in a more gradual manner than both the magnetic recording heads 400, 440 such that the recessed edge 401 is stair or step-like.

The recessed edge 401 of the TS 404 of the magnetic recording head 475 of FIG. 4C comprises five steps 470a-470e (collectively referred to as steps 470). While five steps 470 are shown in FIG. 4C, the magnetic recording head 475 may comprise a fewer number or a greater number of steps 470, and the number of steps 470 is not intended to be limiting. Each step 470a-470e comprises a first surface 484a coupled to a second surface 484b, where the second surface 484b of the first step 470a is coupled to the first surface 484a of the second step 470b, the second surface 484b of the second step 470b is coupled to the first surface 484a of the third step 470c, the second surface 484b of the third step 470c is coupled to the first surface 484a of the fourth step 470d, and the second surface 484b of the fourth step 470d is coupled to the first surface 484a of the fifth step 470e. The first surface 484a of the first step 470a is coupled to the first surface 406a of the central portion 404a of the TS 404. The first surface 484a of the fifth step 470e is coupled to an elongated second surface 484c. The steps 470a-470e extend in the xz-direction towards the first surface 402a of the main pole 402.

The first surface 484a of the first step 470a is disposed at a first angle 486a in the xz-direction with respect to the first surface 406a of the central portion 404a. Similarly, the second surface 484b of the first step 470a is disposed at a second angle 486b in the xz-direction with respect to the first surface 484a of the second step 470b, the second surface 484b of the second step 470b is disposed at a third angle 486c in the xz-direction with respect to the first surface 484a of the third step 470c, the second surface 484b of the third step 470c is disposed at a fourth angle 486d in the xz-direction with respect to the first surface 484a of the fourth step 470d, and the second surface 484b of the fourth step 470d is disposed at a fifth angle 486e in the xz-direction with respect to the first surface 484a of the fifth step 470e. The first, second, third, fourth, and fifth angles 486a-486e are each individually between about 90° to about 175°, such as about 120°. In some embodiments, one or more of the first, second, third, fourth, and fifth angles 486a-486e are the same.

Furthermore, the first surface 484a of the first step 470a is disposed at a sixth angle 488a in the xz-direction with respect to the second surface 484b of the first step 470a, the first surface 484a of the second step 470b is disposed at a seventh angle 488b in the xz-direction with respect to the second surface 484b of the second step 470b, the first surface 484a of the third step 470c is disposed at an eighth angle 488c in the xz-direction with respect to the second surface 484b of the third step 470c, the first surface 484a of the fourth step 470d is disposed at a ninth angle 488d in the xz-direction with respect to the second surface 484b of the fourth step 470d, and the first surface 484a of the fifth step 470e is disposed at a tenth angle 488e in the xz-direction with respect to the elongated second surface 484c. The sixth, seventh, eighth, ninth, and tenth angles 488a-488e are each individually between about 90° to about 175°, such as about 120°. In some embodiments, one or more of the sixth, seventh, eighth, ninth, and tenth angles 488a-488e are the same.

The first surface 484a of each step 470a-470e has a first length 490 between about 50 nm to about 600 nm and the second surface 484b of each step 470a-470e has a second length 492 between about 100 nm to about 3000 nm. While the first length 490 is shown slightly longer than or about equal to the second length 492 in FIG. 4C, the first and second lengths 490, 492 may vary. For example, the first length 490 may be shorter than the second length 492, or the first and second lengths 490, 492 may be equal. As such, the lengths 490, 492 are not intended to be limiting and are merely examples. Furthermore, while the second surface 484b of each step 470a-470e is shown as being parallel to the MFS 406b, the second surface 484b of each step 470a-470e may be disposed at an angle to the MFS 406b.

The central portion 404a of the TS 404 between the first surface 406a and the MFS 406b has a first throat height 472 in the z-direction. The outer portions 404b of the TS 404 comprise five or more throat heights in the z-direction. As shown in FIG. 4C, a second throat height 474 is defined between the MFS 406b and the second surface 484b of the first step 470a, a third throat height 476 is defined between the MFS 406b and the second surface 484b of the second step 470b, a fourth throat height 478 is defined between the MFS 406b and the second surface 484b of the third step 470c, a fifth throat height 480 is defined between the MFS 406b and the second surface 484b of the fourth step 470d, and a sixth throat height 482 is defined between the MFS 406b and the elongated second surface 484c.

The second throat height 474 is greater than the first throat height 472, the third throat height 476 is greater than the second throat height 474, the fourth throat height 478 is greater than the third throat height 476, the fifth throat height 480 is greater than the fourth throat height 478, and the sixth throat height 482 is greater than the first, second, third, fourth, and fifth throat heights 472, 474, 476, 478, 480. Thus, going from the central portion 404a towards the outer portions 404b, the throat height of the TS 404 increases. The first throat height 472 is between about 100 nm to about 350 nm, such as about 250 nm. The sixth throat height 482 is between about 400 nm to about 1000 nm, such as about 500 nm. As such, the TS 404 has varying throat heights 472, 474, 476, 478, 480, 482, wherein the first throat height 472 is shorter closer to the main pole 402, and the sixth throat height 482 is larger further away from the main pole 402 in the cross-track direction. In other words, the recessed edge 401 of the TS 404 tapers in thickness in the cross-track direction from the outer portions 404b towards the central portion 404a.

While the outer portions 404b of FIG. 4C are shown as being symmetrical, the outer portions 404b may be asymmetrical. For example, the outer portion 404b in the x-direction (i.e., the rightmost side) may have more or less steps 470 than the outer portion 404b in the −x-direction (i.e., the leftmost side), or the step(s) 470 of the outer portion 404b in the x-direction may be steeper than the step(s) 470 of the outer portion 404b in the −x-direction. In some embodiments, only one outer portion 404b may vary in throat height from the central portion 404a, or one outer portion 404b may have different throat heights or throat height variations than the other outer portion 404b. For example, the outer portion 404b in the x-direction (i.e., the rightmost side) may have one or more of the second through sixth throat heights 474, 476, 478, 480, 482 while the outer portion 404b in the −x-direction (i.e., the leftmost side) may have one or more of the first through fifth throat heights 472, 474, 476, 478, 480. Such asymmetry in the outer portions 404b may be beneficial in SMR, where the XTI demands may vary from one side of the write head to the other.

The magnetic recording heads 400, 440, 475 of FIGS. 4A-4C having a shorter throat height in the central portion 404a nearest the main pole 402 and a larger throat height in the outer portions 404b furthest from the main pole 402 strengthens the writing capabilities of the magnetic recording heads 400, 440, 475, without degrading the XTI or worsening spill-over magnetic erasures. As such, the overall performance and reliability of the magnetic recording heads 400, 440, 475 is enhanced.

Figure 5A:
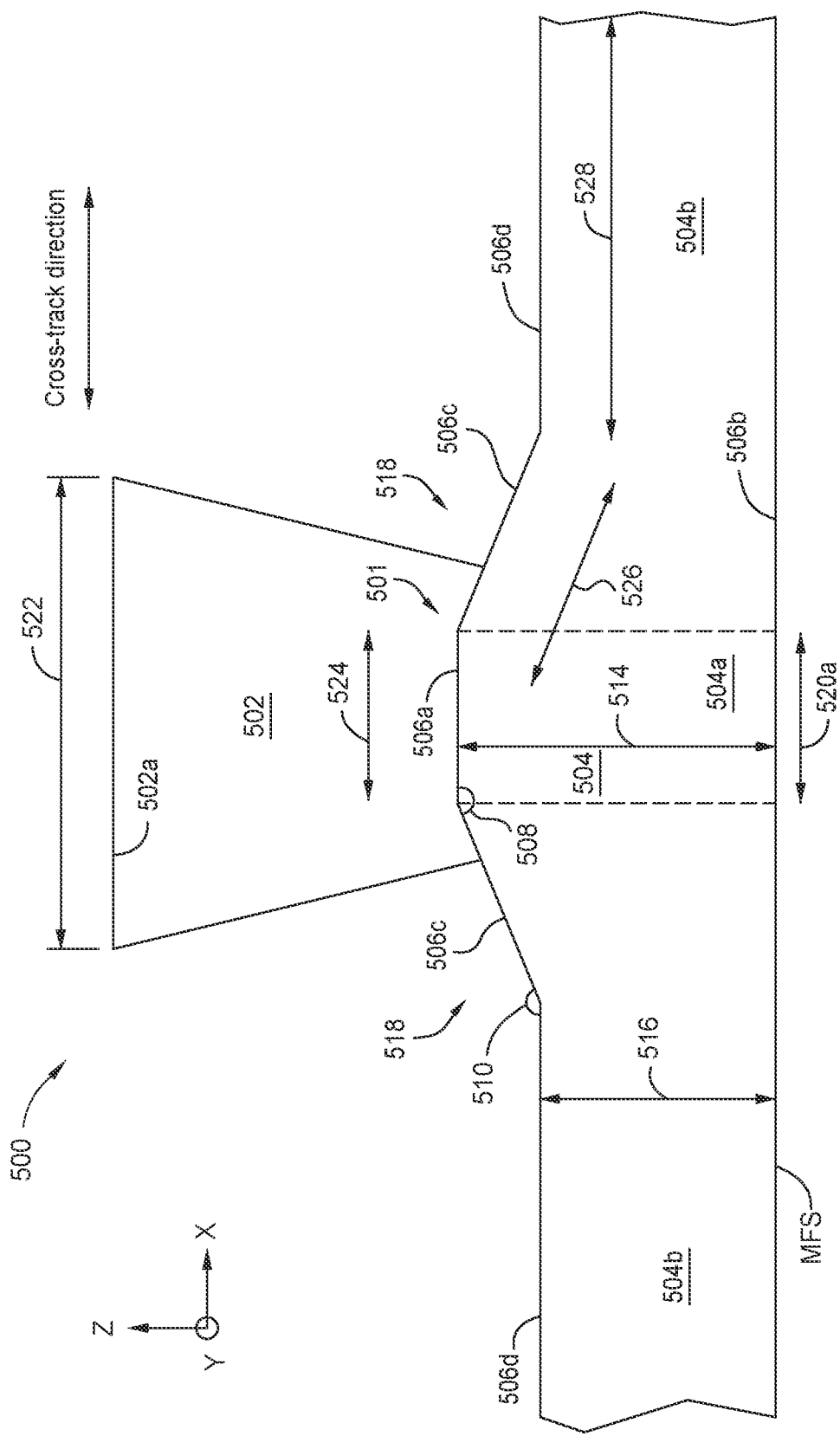
Figure 5B:
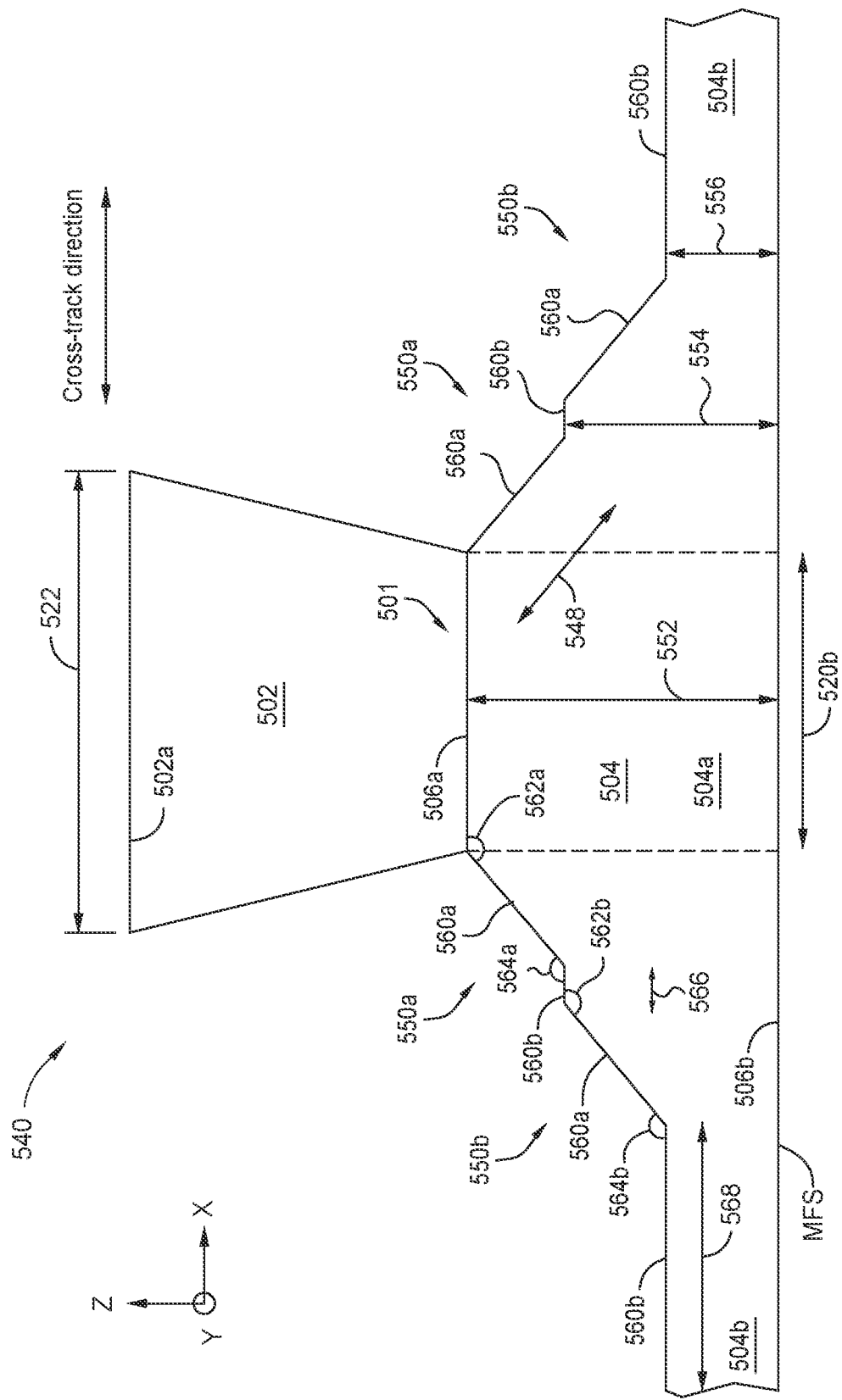
Figure 5C:
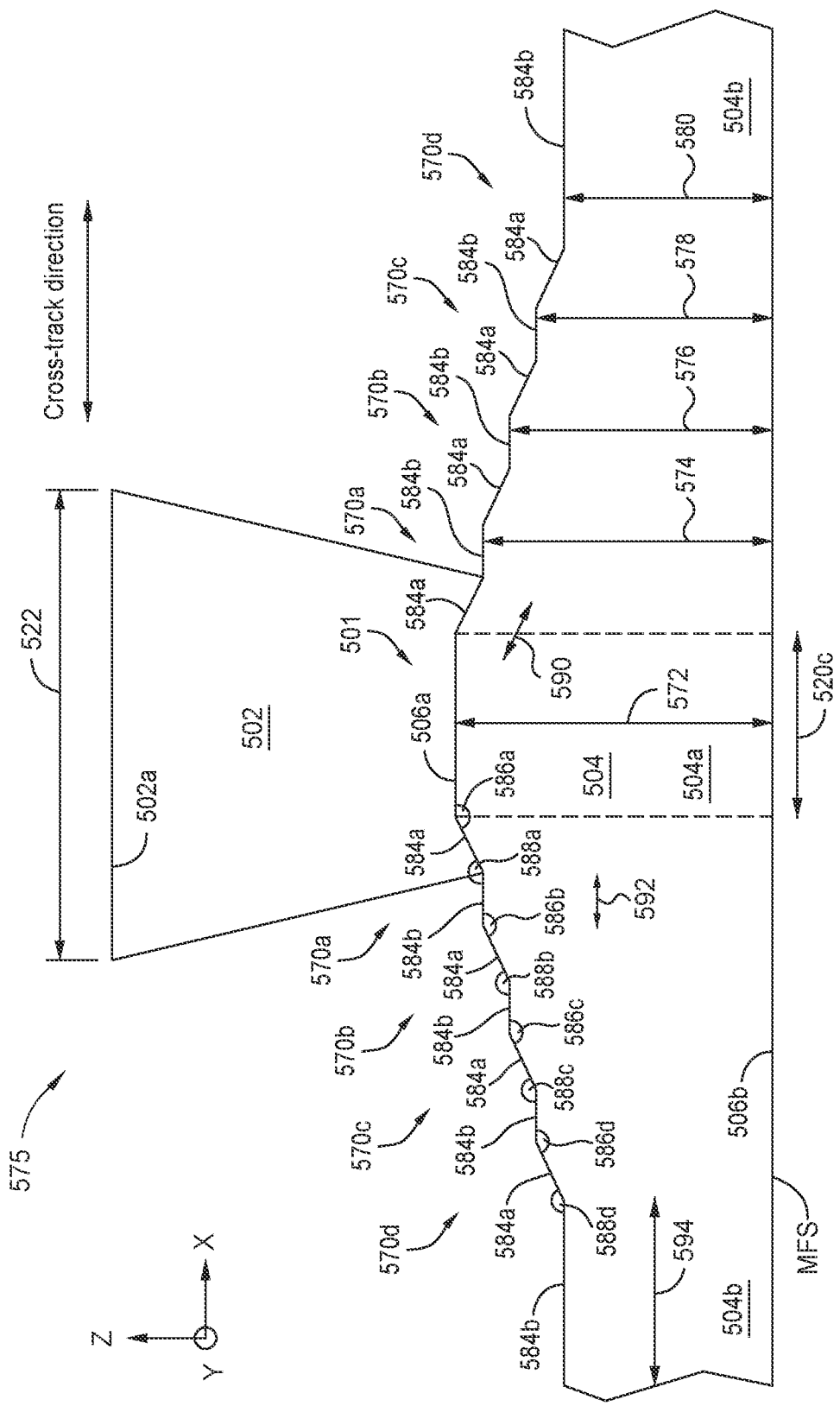

FIGS. 5A-5C illustrate cross-sectional views of magnetic recording heads 500, 540, 575, respectively, according to various embodiments. Each of the magnetic recording heads 500, 540, 575 may be the write head 210 of FIG. 2. Each of the magnetic recording heads 500, 540, 575 is within a magnetic recording device, such as the magnetic recording device 100 of FIG. 1. Each of the magnetic recording heads 500, 540, 575 may be the magnetic recording head 300 of FIG. 3, and various elements, such as the side shields, side gaps, and trailing gap, of the magnetic recording heads 500, 540, 575 of FIGS. 5A-5C are not shown for clarity. Moreover, it is noted that FIGS. 5A-5C are not drawn to scale, particularly in the x-direction and the z-direction, and are not intended to be limiting as such. For example, FIGS. 5A-5C focus primarily on a central portion of the trailing shield 504 without showing the outer ends extending away in the x-directions.

The magnetic recording heads 500, 540, 575 of FIGS. 5A-5C comprises a main pole 502 and a trailing shield (TS) 504. The TS 504 comprises a central portion 504a and two outer portions 504b coupled to the central portion 504a. The central portion 504a and the outer portions 504b are defined by the dashed lines. The outer portions 504b are mirror images of one another. The main pole 502 has a first width 522 in the x-direction (i.e., the cross-track direction). A first surface 506a of the central portion 504a of the TS 504 is disposed adjacent to the main pole 502. The first surface 506a may be substantially linear in the x-direction such that the first surface 506a of the TS 504 is parallel to the MFS 506b. A second surface 506b of the TS 504 is disposed opposite to the first surface 506a at the MFS. The second surface 506b may be referred to as the MFS 506b. For perspective, it is noted that the y-direction is the along-the-track direction.

In each of the magnetic recording heads 500, 540, 575, the central portion 504a has a first throat height greater 514 than a second throat height 516 of the outer portions 504b, as described further below. A recessed edge 501 of the TS 504 disposed opposite to the MFS 506b tapers in thickness in the cross-track direction towards the outer portions 504b while the MFS 506b remains substantially planar or flat.

The TS 504 of the magnetic recording head 500 further comprises third surfaces 506c coupled to the first surface 506a. The third surfaces 506c are disposed at a first angle 508 in the −xz-direction with respect to the first surface 506a. The first angle 508 is between about 100° to about 175°, such as about 140°. Fourth surfaces 506d of the TS 504 are coupled to the third surfaces 506c. The fourth surfaces 506d are disposed at a second angle 510 in the −xz-direction with respect to the third surfaces 506c. The second angle 510 is between about 100° to about 175°, such as about 140°. The first, third, and fourth surfaces 506a, 506c, 506d form a step 518 between the central portion 504a to the outer portions 504b. The step 518 extends in the −xz-direction towards the MFS 506b.

The first surface 506a has a first length 524 between about 50 nm to about 1000 nm, such as about 600 nm, each of the third surfaces 506c have a second length 526 between about 50 nm to about 1000 nm, such as about 600 nm, and each of the fourth surfaces 506d have a third length 528 between about 500 nm to about 16 μm. In some embodiments, the third length 528 is about half the total width (not shown) of the TS 504, where the total width of the TS 504 is about 30 μm. While the third length 528 is shown to be the longest in FIG. 5A, the lengths 524, 526, 528 may vary. For example, the second length 526 may be shorter than the first length 524, or the first, second, and third lengths 524, 526, 528 may be equal. As such, the lengths 524, 526, 528 are not intended to be limiting. Moreover, while the fourth surfaces 506d are shown to be parallel to the MFS 506b, the fourth surfaces 506d may be angled in the −xz-direction towards the MFS 506b.

In FIG. 5A, the central portion 504a of the TS 504 between the first surface 506a and the MFS 506b has a first throat height 514 in the z-direction. The outer portions 504b of the TS 504 between the MFS 506b and the fourth surfaces 506d have a second throat height 516 in the z-direction. The first throat height 514 is greater than the second throat height 516. Thus, going from the central portion 504a towards the outer portions 504b, the throat height of the TS 504 decreases.

The first throat height 514 is between about 400 nm to about 900 nm, such as about 650 nm. The second throat height 516 is between about 100 nm to about 700 nm, such as about 500 nm. As such, the TS 504 has varying throat heights 514, 516, where the first throat height 514 is larger closer to the main pole 502, and the second throat height 516 is shorter further away from the main pole 502 in the cross-track direction. In other words, the recessed edge 501 of the TS 504 tapers in thickness in the cross-track direction from the central portion 504a towards the outer portions 504b.

While the outer portions 504b of FIG. 5A are shown as being symmetrical, the outer portions 504b may be asymmetrical. For example, the outer portion 504b in the x-direction (i.e., the rightmost side) may have more or less steps 518 than the outer portion 504b in the −x-direction (i.e., the leftmost side), or the step(s) 518 of the outer portion 504b in the x-direction may be steeper than the step(s) 518 of the outer portion 504b in the −x-direction. In some embodiments, only one outer portion 504b may vary in throat height from the central portion 504a, or one outer portion 504b may have different throat heights or throat height variations than the other outer portion 504b. For example, the outer portion 504b in the x-direction (i.e., the rightmost side) may have the second throat height 516 while the outer portion 504b in the −x-direction (i.e., the leftmost side) may have the first throat height 514. Such asymmetry in the outer portions 504b may be beneficial in SMR, where the XTI demands may vary from one side of the write head to the other.

While the magnetic recording head 500 of FIG. 5A is shown having one step 518 between the central portion 504a and the outer portions 504b, the magnetic recording head 500 may comprise more than one step 518. The magnetic recording head 540 of FIG. 5B is similar to the magnetic recording head 500 of FIG. 5A; however, the TS 504 of magnetic recording head 540 varies in throat height in a more gradual manner such that the recessed edge 501 is zigzagged or jagged-like in appearance.

In FIG. 5B, each outer portion 504b of the TS 504 comprises two steps 550a-550b (collectively referred to as steps 550). While two steps 550 are shown in FIG. 5B, the magnetic recording head 540 may comprise a fewer number or a greater number of steps 550, and the number of steps 550 is not intended to be limiting. Each step 550a-550b comprises a first surface 560a coupled to a second surface 560b, where the second surface 560b of the first step 550a is coupled to the first surface 560a of the second step 550b. The first surface 560a of the first step 550a is coupled to the first surface 506a of the central portion 404a of the TS 504. The second surface 560b of the second step 550b may be elongated, having a greater length than the second surface 560b of the first step 550a. The steps 550a-550b extend in the −xz-direction towards the MFS 506b.

The first surface 560a of the first step 550a is disposed at a first angle 562a in the −xz-direction with respect to the first surface 506a of the central portion 504a, where the first angle 562a is between about 100° to about 175°, such as about 140°. Similarly, the second surface 560b of the first step 550a is disposed at a second angle 562b in the −xz-direction with respect to the first surface 560a of the second step 550b, where the second angle 562b is between about 100° to about 175°, such as about 140°. In some embodiments, the first and second angles 562a, 562b are the same.

Furthermore, the first surface 560a of the first step 550a is disposed at a third angle 564a in the −xz-direction with respect to the second surface 560b of the first step 550a, where the third angle 564a is between about 100° to about 175°. The first surface 560a of the second step 550b is disposed at a fourth angle 564b in the −xz-direction with respect to the second surface 560b of the second step 550b, where the fourth angle 564b is between about 100° to about 175°. In some embodiments, the third and fourth angles 564a, 564b are the same.

The first surface 560a of each step 550a-550b has a first length 548 between about 50 nm to about 600 nm. The second surface 560b of the first step 550a has a second length 566 between about 100 nm to about 10,000 nm. The second surface 560b of the second step 550b has a third length 568 between about 500 nm to about 15,000 nm. The second length 566 may be equal to or less than the third length 568. While the first length 548 is shown longer than the second length 566 and shorter than the third length 568 in FIG. 5B, the lengths 548, 566, 568 may vary. For example, the first length 548 may be shorter than the second length 566, or the first, second, and third lengths 548, 566, 568 may be about equal. As such, the lengths 548, 566, 568 are not intended to be limiting and are merely examples. Furthermore, while the second surface 560b of each step 550a-550b is shown as being parallel to the MFS 506b, the second surface 560b of each step 550a-550b may be disposed at an angle to the MFS 506b.

In FIG. 5B, the central portion 504a of the TS 504 between the first surface 506a and the MFS 506b has a first throat height 552 in the z-direction. The outer portions 504b of the TS 504 comprise two or more throat heights in the z-direction. As shown in FIG. 5B, a second throat height 554 is defined between the MFS 506b and the second surface 560b of the first step 550a, and a third throat height 556 is defined between the MFS 506b and the second surface 560b of the second step 550b.

The first throat height 552 is greater than both the second throat height 554 and the third throat height 556, while the second throat height 554 is greater than the third throat height 556. Thus, going from the central portion 504a towards the outer portions 504b, the throat height of the TS 504 gradually decreases. The first throat height 552 is between about 400 nm to about 900 nm, such as about 650 nm. The third throat height 556 is between about 100 nm to about 500 nm, such as about 250 nm. As such, the TS 504 has varying throat heights 552, 554, 556, where the first throat height 552 is larger closer to the main pole 502, and the third throat height 556 is shorter further away from the main pole 502 in the cross-track direction. In other words, the recessed edge 501 of the TS 504 tapers in thickness in the cross-track direction from the central portion 504a towards the outer portions 504b.

While the outer portions 504b of FIG. 5B are shown as being symmetrical, the outer portions 504b may be asymmetrical. For example, the outer portion 504b in the x-direction (i.e., the rightmost side) may have more or less steps 550 than the outer portion 504b in the −x-direction (i.e., the leftmost side), or the step(s) 550 of the outer portion 504b in the x-direction may be steeper than the step(s) 550 of the outer portion 504b in the −x-direction. In some embodiments, only one outer portion 504b may vary in throat height from the central portion 504a, or one outer portion 504b may have different throat heights or throat height variations than the other outer portion 504b. For example, the outer portion 504b in the x-direction (i.e., the rightmost side) may have the second and/or third throat heights 554, 556 while the outer portion 504b in the −x-direction (i.e., the leftmost side) may have the first and/or second throat heights 552, 554. Such asymmetry in the outer portions 504b may be beneficial in SMR, where the XTI demands may vary from one side of the write head to the other.

The magnetic recording head 575 of FIG. 5C is similar to the magnetic recording head 500 of FIG. 5A and the magnetic recording head 540 of FIG. 5B; however, the TS 504 of magnetic recording head 575 varies in throat height in a more gradual manner than both the magnetic recording heads 500, 540 such that the recessed edge 501 has a stair or step-like appearance.

The recessed edge 501 of the TS 504 of the magnetic recording head 575 of FIG. 5C comprises four steps 570a-570d (collectively referred to as steps 570). While four steps 570 are shown in FIG. 5C, the magnetic recording head 575 may comprise a fewer number or a greater number of steps 570, and the number of steps 570 is not intended to be limiting. Each step 570a-570d comprises a first surface 584a coupled to a second surface 584b, where the second surface 584b of the first step 570a is coupled to the first surface 584a of the second step 570b, the second surface 584b of the second step 570b is coupled to the first surface 584a of the third step 570c, and the second surface 584b of the third step 570c is coupled to the first surface 584a of the fourth step 570d. The first surface 584a of the first step 570a is coupled to the first surface 506a of the central portion 504a of the TS 504. The second surface 584b of the fourth step 570d may be elongated, having a greater length than the second surfaces 584b of the first, second, and third steps 570a-570b. The steps 570a-570d extend in the −xz-direction towards the MFS 506b.

The first surface 584a of the first step 570a is disposed at a first angle 586a in the −xz-direction with respect to the first surface 506a of the central portion 504a. Similarly, the second surface 584b of the first step 570a is disposed at a second angle 586b in the −xz-direction with respect to the first surface 584a of the second step 570b, the second surface 584b of the second step 570b is disposed at a third angle 586c in the −xz-direction with respect to the first surface 584a of the third step 570c, and the second surface 584b of the third step 570c is disposed at a fourth angle 586d in the −xz-direction with respect to the first surface 584a of the fourth step 570d. The first, second, third, and fourth, angles 586a-586d are each individually between about 90° to about 175°, such as about 120°. In some embodiments, one or more of the first, second, third, and fourth, angles 586a-586d are the same.

Furthermore, the first surface 584a of the first step 570a is disposed at a fifth angle 588a in the −xz-direction with respect to the second surface 584b of the first step 570a, the first surface 584a of the second step 570b is disposed at a sixth angle 588b in the −xz-direction with respect to the second surface 584b of the second step 570b, the first surface 584a of the third step 570c is disposed at a seventh angle 588c in the −xz-direction with respect to the second surface 584b of the third step 570c, and the first surface 584a of the fourth step 570d is disposed at an eighth angle 588d in the −xz-direction with respect to the second surface 584b of the fourth step 570d. The fifth, sixth, seventh, and eighth, angles 588a-588d are each individually between about 90° to about 175°, such as about 120°. In some embodiments, one or more of the fifth, sixth, seventh, and eighth, angles 588a-588d are the same.

The first surface 584a of each step 570a-570d has a first length 590 between about 50 nm to about 600 nm and the second surface 484b of each of the first, second, and third steps 570a-570c has a second length 592 between about 100 nm to about 3000 nm. The second surface 584b of the fourth step 570d has a third length 594 between about 500 nm to about 15,000 nm. The second length 592 may be equal to or less than the third length 594. While the first length 590 is shown slightly longer than or about equal to the second length 592 and shorter than the third length 594 in FIG. 5C, the first, second, and third lengths 590, 592, 594 may vary. For example, the first length 590 may be shorter than the second length 592, or one or more of the first, second, and third lengths 590, 592, 594 may be equal. As such, the lengths 590, 592, 594 are not intended to be limiting and are merely examples. Furthermore, while the second surface 584b of each step 570a-570d is shown as being parallel to the MFS 506b, the second surface 584b of each step 570a-570d may be disposed at an angle to the MFS 506b.

In FIG. 5C, the central portion 504a of the TS 504 has a fourth width 520c in the x-direction less than the first width 522 of the main pole 502. The central portion 504a of the TS 504 between the first surface 506a and the MFS 506b has a first throat height 572 in the z-direction. The outer portions 504b of the TS 504 comprise four or more throat heights in the z-direction. As shown in FIG. 5C, a second throat height 574 is defined between the MFS 506b and the second surface 584b of the first step 570a, a third throat height 576 is defined between the MFS 506b and the second surface 584b of the second step 570b, a fourth throat height 578 is defined between the MFS 506b and the second surface 584b of the third step 570c, and a fifth throat height 580 is defined between the MFS 506b and the second surface 584b of the fourth step 570d.

The fourth throat height 578 is greater than the fifth throat height 580, the third throat height 576 is greater than the fourth throat height 578, the second throat height 574 is greater than the third throat height 576, and the first throat height 572 is greater than the second, third, fourth, and fifth throat heights 574, 576, 578, 580. Thus, going from the central portion 504a towards the outer portions 504b, the throat height of the TS 504 gradually decreases. The first throat height 572 is between about 400 nm to about 900 nm, such as about 650 nm. The fifth throat height 580 is between about 100 nm to about 500 nm, such as about 250 nm. As such, the TS 504 has varying throat heights 574, 576, 578, 580, wherein the first throat height 572 is larger closer to the main pole 502, and the fifth throat height 580 is shorter further away from the main pole 502 in the cross-track direction. In other words, the recessed edge 501 of the TS 504 tapers in thickness in the cross-track direction from the central portion 504a towards the outer portions 504b.

While the outer portions 504b of FIG. 5C are shown as being symmetrical, the outer portions 504b may be asymmetrical. For example, the outer portion 504b in the x-direction (i.e., the rightmost side) may have more or less steps 570 than the outer portion 504b in the −x-direction (i.e., the leftmost side), or the step(s) 570 of the outer portion 504b in the x-direction may be steeper than the step(s) 570 of the outer portion 504b in the −x-direction. In some embodiments, only one outer portion 504b may vary in throat height from the central portion 504a, or one outer portion 504b may have different throat heights or throat height variations than the other outer portion 504b. For example, the outer portion 504b in the x-direction (i.e., the rightmost side) may have one or more of the second through fourth throat heights 574, 576, 578, 580 while the outer portion 504b in the −x-direction (i.e., the leftmost side) may have one or more of the first through third throat heights 572, 574, 576, 578. Such asymmetry in the outer portions 504b may be beneficial in SMR, where the XTI demands may vary from one side of the write head to the other.

The magnetic recording heads 500, 540, 575 of FIGS. 5A-5C having a shorter throat height in the central portion 504a nearest the main pole 502 and a larger throat height in the outer portions 504b furthest from the main pole 502 reduces spill-over magnetic erasures, improving the XTI of the magnetic recording heads 500, 540, 575 without weakening the writing strength. As such, the overall performance and reliability of the magnetic recording heads 500, 540, 575 is enhanced.

Therefore, utilizing a trailing shield in a magnetic recording head having varying throat heights in the cross-track direction strengthens the writing capabilities of the magnetic recording heads, without degrading the XTI or worsening spill-over magnetic erasures, or reduces spill-over magnetic erasures, improving the XTI of the magnetic recording head without weakening the writing strength. As such, the overall performance and reliability of the magnetic recording head is enhanced.

In one embodiment, a magnetic recording head comprises a main pole and a trailing shield disposed adjacent to the main pole. The trailing shield comprises a recessed edge adjacent to the main pole, a media facing surface disposed opposite the recessed edge, the media facing surface being substantially planar, a central portion disposed adjacent to the main pole having a first throat height defined between the recessed edge and the media facing surface, and at least one outer portion disposed adjacent to the central portion, the at least one outer portion having a second throat defined between the recessed edge and the media facing surface. The second throat height is greater than the first throat height such that the trailing shield is tapered along the recessed edge in a cross-track direction from the at least one outer portion towards the central portion.

The first throat height is between about 100 nm to about 600 nm and the second throat height is between about 400 nm to about 1000 nm. The recessed edge comprises one or more steps from the central portion to the at least one outer portion. Each of the one or more steps comprises a first surface and a second surface, the first surface of each step being disposed at an angle between about 100° to about 175° with respect to the second surface of each step. The first surface of each step has a first length greater than or equal to a second length of the second surface of each step. The media facing surface is substantially planar.

In another embodiment, a magnetic recording head comprises a main pole and a trailing shield disposed adjacent to the main pole. The trailing shield comprises a recessed edge disposed adjacent to the main pole, a media facing surface disposed opposite the recessed edge, the media facing surface being substantially planar, a central portion disposed adjacent to the main pole having a first throat height defined between a first surface of the recessed edge and the media facing surface, and at least one outer portion disposed adjacent to the central portion, the at least one outer portion having a second throat defined between a second surface of the recessed edge and the media facing surface. The second throat height is less than the first throat height such that the trailing shield is tapered along the recessed edge in a cross-track direction from the central portion towards the at least one outer portion.

The first throat height is between about 400 nm to about 900 nm. The second throat height is between about 100 nm to about 500 nm. The at least one outer portion is two symmetrical outer portions. One or more steps are disposed between the first surface of the recessed edge and the second surface of the recessed edge.

In yet another embodiment, a magnetic recording head comprises a main pole and a trailing shield disposed adjacent to the main pole. The trailing shield comprises a recessed edge disposed adjacent to the main pole, the recessed edge comprising one or more steps, wherein each of the one or more steps comprises a first surface and a second surface, a media facing surface disposed opposite the recessed edge, the media facing surface being substantially planar, a central portion disposed adjacent to the main pole having a first throat height defined between a third surface of the recessed edge and the media facing surface, the third surface being disposed parallel to the media facing surface, and at least one outer portion disposed adjacent to the central portion, the at least one outer portion having a second throat height defined between the second surface of a first step of the one or more steps of the recessed edge and the media facing surface. The first throat height is different than the second throat height such that the trailing shield is tapered along the recessed edge in a cross-track direction.

The one or more steps extend in a first direction towards a first surface of the main pole. The first throat height is less than the second throat height. The one or more steps extend in a second direction towards the media facing surface. The first throat height is greater than the second throat height. A difference between the first throat height and the second throat height is about 50 nm to about 900 nm. The first surface of each step has a first length greater than or equal to a second length of the second surface of each step. The first surface of each step is disposed at an angle between about 100° to about 175° with respect to the second surface of each step. The first surface of each step is disposed at an angle with respect to the third surface of the recessed edge. The second surface of each step is disposed parallel to the third surface of the recessed edge.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording head, comprising:
   a main pole; and
   a trailing shield disposed adjacent to the main pole, the trailing shield comprising:
      a recessed edge disposed adjacent to the main pole;
      a media facing surface disposed opposite the recessed edge, the media facing surface being substantially planar;
      a central portion disposed adjacent to the main pole having a first throat height defined between a first surface of the recessed edge and the media facing surface; and
      at least one outer portion disposed adjacent to the central portion, the at least one outer portion having a second throat height defined between a second surface of the recessed edge and the media facing surface, wherein the second throat height is less than the first throat height such that the trailing shield is tapered along the recessed edge in a cross-track direction from the central portion towards the at least one outer portion.

2. The magnetic recording head of claim 1, wherein the first throat height is between about 400 nm to about 900 nm.

3. The magnetic recording head of claim 1, wherein the second throat height is between about 100 nm to about 500 nm.

4. The magnetic recording head of claim 1, wherein the at least one outer portion is two symmetrical outer portions.

5. The magnetic recording head of claim 1, wherein one or more steps are disposed between the first surface of the recessed edge and the second surface of the recessed edge.

6. The magnetic recording head of claim 1, wherein the at least one outer portion further comprises a third throat height defined between a third surface of the recessed edge and the media facing surface, the third throat height being less than the second throat height.

7. A magnetic recording device comprising a magnetic recording head, the magnetic recording head comprising:
   a main pole; and
   a trailing shield disposed adjacent to the main pole, the trailing shield comprising:
      a recessed edge disposed adjacent to the main pole;

a media facing surface disposed opposite the recessed edge, the media facing surface being substantially planar;

a central portion disposed adjacent to the main pole having a first throat height defined between a first surface of the recessed edge and the media facing surface; and at least one outer portion disposed adjacent to the central portion, the at least one outer portion having a second throat height defined between a second surface of the recessed edge and the media facing surface, wherein the second throat height is less than the first throat height such that the trailing shield is tapered along the recessed edge in a cross-track direction from the central portion towards the at least one outer portion.

8. A magnetic recording head, comprising:

a main pole; and a trailing shield disposed adjacent to the main pole, the trailing shield comprising:

a recessed edge disposed adjacent to the main pole;

a media facing surface disposed opposite the recessed edge, the media facing surface being substantially planar;

a central portion disposed adjacent to the main pole having a first throat height defined between a first surface of the recessed edge and the media facing surface, the first surface being disposed parallel to the media facing surface; and at least one outer portion disposed adjacent to the central portion, wherein:

the recessed edge comprises one or more steps from the central portion to the at least one outer portion, each of the one or more steps comprises a first surface disposed substantially parallel to the media facing surface and a second surface coupled to the first surface, the at least one outer portion has a second throat height defined between the first surface of a first step of the one or more steps and the media facing surface, and the first throat height is greater than the second throat height such that the trailing shield is tapered along the recessed edge in a cross-track direction from the central portion towards the at least one outer portion.

9. The magnetic recording head of claim 8, wherein the second surface of each step is disposed at an angle of about 100 degrees to about 175 degrees with respect to the first surface of each step.

10. The magnetic recording head of claim 8, wherein the first surface of each step has a length of about 100 nm to about 3000 nm, and wherein the second surface of each step has a length of about 50 nm to about 600 nm.

11. The magnetic recording head of claim 8, wherein the central portion has a width in a cross-track direction less than a width of the at least one outer portion.

12. The magnetic recording head of claim 8, wherein the at least one outer portion has a third throat height defined between the first surface of a second step of the one or more steps and the media facing surface, the third throat height being less than the second throat height.

13. A magnetic recording device comprising a magnetic recording head, the magnetic recording head comprising:

a main pole; and a trailing shield disposed adjacent to the main pole, the trailing shield comprising:

a recessed edge disposed adjacent to the main pole;

a media facing surface disposed opposite the recessed edge, the media facing surface being substantially planar;

a central portion disposed adjacent to the main pole having a first throat height defined between a first surface of the recessed edge and the media facing surface, the first surface being disposed parallel to the media facing surface; and at least one outer portion disposed adjacent to the central portion, wherein:

the recessed edge comprises one or more steps from the central portion to the at least one outer portion, each of the one or more steps comprises a first surface disposed substantially parallel to the media facing surface and a second surface coupled to the first surface, the at least one outer portion has a second throat height defined between the first surface of a first step of the one or more steps and the media facing surface, and the first throat height is greater than the second throat height such that the trailing shield is tapered along the recessed edge in a cross-track direction from the central portion towards the at least one outer portion.

14. A magnetic recording head, comprising:

a main pole; and a trailing shield disposed adjacent to the main pole, the trailing shield comprising:

a recessed edge disposed adjacent to the main pole;

a media facing surface disposed opposite the recessed edge, the media facing surface being substantially planar;

a central portion disposed adjacent to the main pole having a first throat height defined between a first surface of the recessed edge and the media facing surface;

a first outer portion disposed adjacent to the central portion, the first outer portion having a second throat height defined between a second surface of the recessed edge and the media facing surface, wherein the second throat height is less than the first throat height; and a second outer portion disposed adjacent to the central portion opposite to the first outer portion, the second outer portion having a third throat height defined between a third surface of the recessed edge and the media facing surface, wherein the third throat height is less than the first throat height, and wherein the trailing shield is tapered along the recessed edge in a cross-track direction from the central portion towards the first and second outer portions.

15. The magnetic recording head of claim 14, wherein the second throat height is equal to the third throat height.

16. The magnetic recording head of claim 14, wherein the second throat height is different than the third throat height.

17. The magnetic recording head of claim 14, wherein the first outer portion and the second outer portion are symmetrical.

18. The magnetic recording head of claim 14, wherein the first outer portion and the second outer portion are asymmetrical.

19. The magnetic recording head of claim 14, wherein the first throat height is between about 400 nm to about 900 nm, and wherein the second throat height and the third throat height are each individually between about 100 nm to about 500 nm.

20. A magnetic recording device comprising a magnetic recording head, the magnetic recording head comprising:
- a main pole; and
- a trailing shield disposed adjacent to the main pole, the trailing shield comprising:
    - a recessed edge disposed adjacent to the main pole;
    - a media facing surface disposed opposite the recessed edge, the media facing surface being substantially planar;
    - a central portion disposed adjacent to the main pole having a first throat height defined between a first surface of the recessed edge and the media facing surface;
    - a first outer portion disposed adjacent to the central portion, the first outer portion having a second throat height defined between a second surface of the recessed edge and the media facing surface, wherein the second throat height is less than the first throat height; and
    - a second outer portion disposed adjacent to the central portion opposite to the first outer portion, the second outer portion having a third throat height defined between a third surface of the recessed edge and the media facing surface, wherein the third throat height is less than the first throat height, and wherein the trailing shield is tapered along the recessed edge in a cross-track direction from the central portion towards the first and second outer portions.

* * * * *